United States Patent [19]

Linde

[11] 4,430,303

[45] Feb. 7, 1984

[54] REMOVAL OF UNDESIRABLE GASEOUS COMPONENTS FROM A HOT WASTE GAS

[75] Inventor: Gerhard Linde, Grunwald, Fed. Rep. of Germany

[73] Assignee: Linde Aktiengesellschaft, Wiesbaden, Fed. Rep. of Germany

[21] Appl. No.: 429,409

[22] Filed: Sep. 30, 1982

[51] Int. Cl.³ .............................................. F01N 3/10
[52] U.S. Cl. ....................... 422/170; 55/73; 55/74; 55/387; 422/177; 423/239; 423/244
[58] Field of Search ................ 422/4, 170, 171, 177, 422/178; 423/237, 239, 242, 244 R; 252/470; 55/73, 74, 179, 387

[56] References Cited

U.S. PATENT DOCUMENTS

| | | | |
|---|---|---|---|
| 3,730,691 | 5/1973 | Lang et al. | 422/171 |
| 3,864,451 | 2/1975 | Lee et al. | 423/239 |
| 4,089,930 | 5/1978 | Kittrell et al. | 423/239 |
| 4,101,634 | 7/1978 | Ploeg | 423/239 |
| 4,141,959 | 2/1979 | Kato et al. | 423/239 |
| 4,164,546 | 8/1979 | Welty, Jr. et al. | 423/239 |
| 4,220,632 | 9/1980 | Pence et al. | 423/239 |
| 4,272,497 | 6/1981 | Takahashi et al. | 423/239 |
| 4,282,115 | 8/1981 | Atsukawa et al. | 423/239 X |

FOREIGN PATENT DOCUMENTS 1124639  6/1982  Canada .

*Primary Examiner*—Richard L. Chiesa
*Attorney, Agent, or Firm*—Millen & White

[57] ABSTRACT

In a process for the removal of sulfur dioxide and nitrogen oxides, the waste gas is cooled and scrubbed with a physical absorbent selective for sulfur dioxide. The nitrogen oxides are catalytically removed from the waste gas by reaction with ammonia, which is added to the waste gas prior to the scrubbing step. The catalyst packing is disposed in the same housing and is at the hot end of a regenerator for cooling the waste gas and is arranged upstream of the regenerator packing. The cooling is conducted to the dew point so as to dissolve residual ammonia, and air is used to remove the ammonia during regeneration, the resultant heated air being primarily used in the combustion zone.

6 Claims, 2 Drawing Figures

REMOVAL OF UNDESIRABLE GASEOUS COMPONENTS FROM A HOT WASTE GAS

BACKGROUND OF THE INVENTION

This invention relates to a process for the removal of undesirable gaseous components from a hot waste gas, e.g., from a combustion process, containing sulfur dioxide and other contaminants, wherein the waste gas is cooled and scrubbed with a scrubbing agent selective for sulfur dioxide, as well as to an apparatus for conducting the process.

Hot waste gases are formed in the combustion of carbon-containing fuels; these waste gases contain gaseous components which, for reasons of environmental protection, must not be emitted to the environment in a concentration above legal limits. Sulfur compounds, in particular, such as sulfur dioxide, produced in the combustion of fossil fuels, must be substantially completely removed from the waste gas. A process has been proposed in DOS No. 2,848,721 for the removal of such compounds wherein hot waste gas is cooled and then scrubbed with a so-called physical absorbent, i.e., no chemical reaction occurring. In this method, almost the entire sulfur dioxide contained originally in the waste gas is scrubbed out. The waste gas, freed of sulfur dioxide, is then exhausted into the atmosphere.

Whereas the aforesaid prior-art process serves merely for the removal of sulfur dioxide, in many cases the waste gas contains, besides sulfur dioxide, additional components, especially nitrogen oxides, which also must not be exhausted into the atmosphere. To solve the problem of nitrogen oxide pollution, many proposals have been made, e.g., U.S. Pat. No. 4,164,546, Welty, "Method of Removing Nitrogen Oxides from Gaseous Mixtures" and references cited therein. Specifically, there are several processes based on the catalytic reaction of nitrogen oxides with ammonia to produce nitrogen. The Welty U.S. patent also suggests processes involving the removal of both nitrogen oxides and sulfur dioxide; however the emphasis in this patent is on the simultaneous removal of nitrogen oxides and sulfur dioxide, and also on non-noble metal oxides, e.g., copper oxide and vanadium pentoxide as catalysts, with little or no emphasis on heat exchange efficiencies.

SUMMARY

An object of this invention is to provide a thermodynamically improved process for the sequential removal of nitrogen oxides and sulfur dioxide from waste gas.

Another object is to provide apparatus for such a process.

Upon further study of the specification and appended claims, further objects and advantages of this invention will become apparent to those skilled in the art.

To attain these objects, the process is based on the step of catalytically reducing nitrogen oxides contained in the waste gas by means of ammonia added prior to the scrubbing step; specifically, the waste gas is mixed with ammonia and conducted, together with the latter, over a catalyst favoring the reaction of the nitrogen oxides with ammonia. The thus-formed reaction products are essentially nitrogen and water, both of which can be emitted into the environment without any deleterious effect. It is essential that the ammonia be reacted before the scrubbing step, since its presence could lead to undesired chemical reactions during the subsequent physical scrubbing step for the removal of sulfur dioxide. Furthermore, it is important that the catalytic reaction be conducted before the cooling of the waste gas. Several aspects are provided, as described hereinafter, to achieve thermodynamic efficiency of the process.

The process of this invention then makes it possible, without any special investment in apparatus, to remove nitrogen oxides from the waste gas in addition to the removal of sulfur dioxide.

It has been found that an especially extensive reaction of the nitrogen oxides takes place at the temperature of the hot waste gas, e.g., about 200° C. to 250° C., particularly about 220° C. to 240° C. Therefore, the ammonia is admixed to the hot waste gas and the resultant mixture is conducted, prior to being cooled, over the catalyst. Only subsequently is the hot waste gas, freed of nitrogen oxides, subjected to the cooling step which is generally conducted at about 100° C. to 50° C., preferably 80° C. to 60° C.

It has proven to be advantageous, according to a further development of the process of this invention, for the waste gas to be cooled to below the dew point of the water in the waste gas. In this way, condensed water is formed wherein unreacted ammonia is dissolved, thus preventing ammonia from entering into the scrubbing stage.

Advantageously, in one embodiment of the present invention, the ammonia is added in excess, and unconsumed ammonia is discharged before the scrubbing step. It is especially expedient, in this connection, to discharge the unconsumed ammonia together with purified waste gas. If the waste gas is cooled in regenerators, then condensed water is formed at the cold end of the regenerators wherein the excess ammonia is dissolved. In the off-stream phase, purified waste gas is conducted through the regenerators and absorbs the dissolved ammonia from the water.

In a further development of the process of this invention, it is proposed that the catalyst be regenerated with air, the latter being subsequently conducted to the combustion stage. By means of this mode of operation, it is possible to remove the trace compounds formed by secondary reactions, for example, $NH_4NO_3$.

In this connection, it is advantageous if, in another embodiment of the process of this invention, the cooling of the waste gas is effected at least in part by transferring heat to the air utilized for the regeneration of the catalyst. On the one hand, preheating of the air shortens the time required for catalyst regeneration, and, on the other hand, energy is saved by returning the waste heat into the combustion process.

In an advantageous embodiment of the present invention, the cooling of the waste gas is conducted regeneratively in two successive stages. The first (hot) stage is regenerated with air, the latter being subsequently passed on to combustion, whereas the second (colder) stage is regenerated with purified waste gas which thereafter is discharged into the atmosphere.

An apparatus for conducting the process of this invention comprises a regenerator arranged in the flow path of a waste gas conduit, the regenerator housing also containing catalyst packing in the regenerator and a gas supply means terminating in the flow path upstream of the catalyst packing. Advantageously, a pair or a triplet of cyclically reversible regenerators is provided to ensure continuous operation. This arrangement has not only the advantage that there is no need for an additional container for the catalyst, thus incurring only a very small additional expenditure in apparatus, but also provides the further advantage that no additional regenerating gas cross sections are required for the catalyst. The catalyst is thereby regenerated with the same gas which is used for purging the regenerators.

In a particular preferred embodiment of the apparatus of this invention, the catalyst packing is located at the hot end of the regenerator disposed upstream of the regenerator packing.

The invention is particularly useful for the treatment of gases of the following composition:

$N_2$ about 76%
$O_2$ about 2%
$CO_2$ about 14%
$H_2O$ about 7.8%
$SO_2$ 0.1% to 0.4%
$NO_y$ 300 to 800 ppm

BRIEF DESCRIPTION OF THE DRAWINGS

The invention, as well as additional details of the invention, will be explained in greater detail with reference to the drawings wherein.

DETAILED DESCRIPTION OF DRAWINGS

Figure 1:
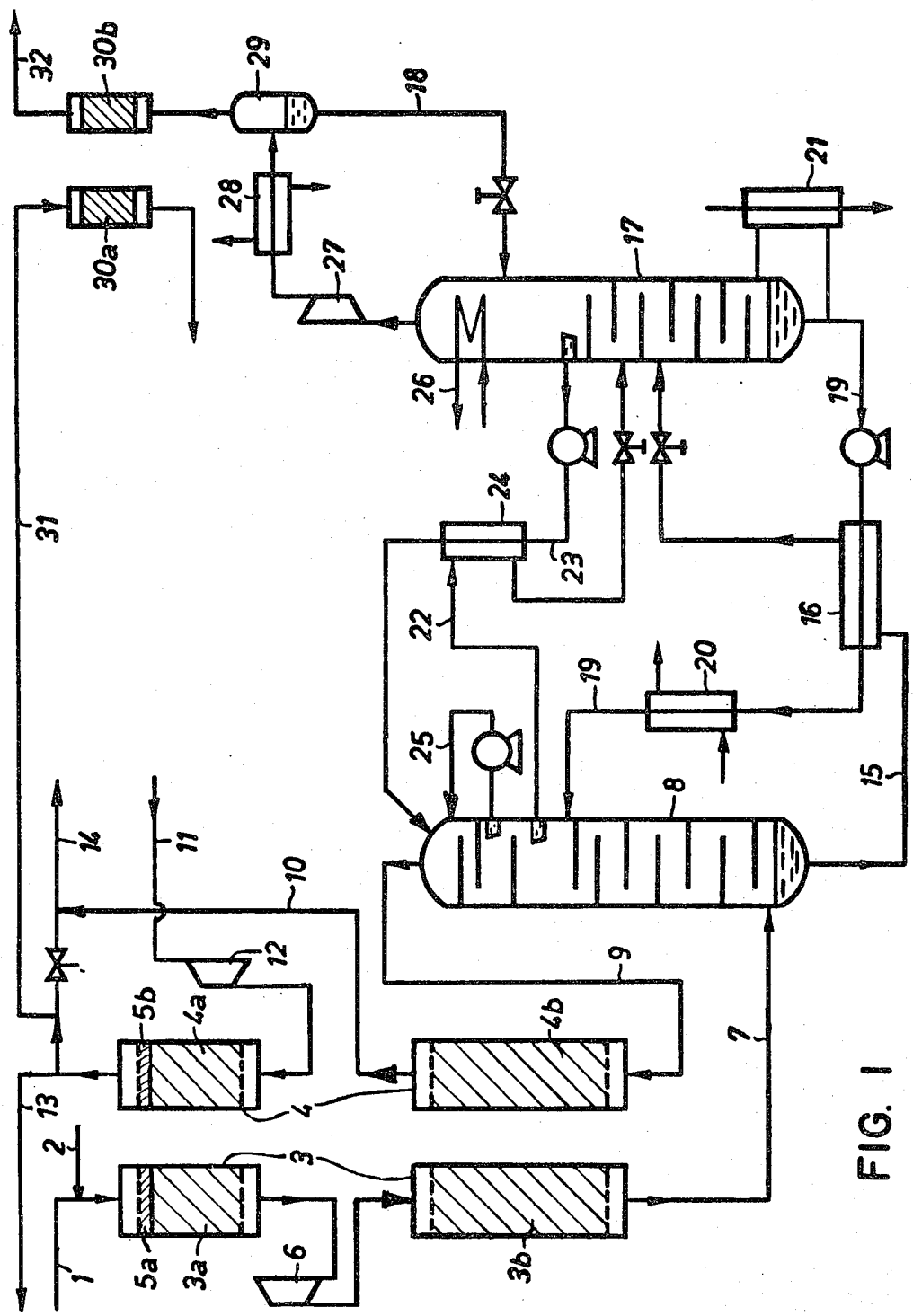
FIG. 1 is a schematic flow chart of the preferred comprehensive embodiment of the process of this invention.

The process illustrated in FIG. 1 serves for the removal of sulfur dioxide and nitrogen oxides from a waste gas obtained, for example, from a plant for the production of energy or process heat. Examples for such plants are coal-operated power plants, waste liquor boilers in the wood pulp industry, auxiliary boilers in chemical or metallurgical plants, such as olefin or synthesis plants, as well as steam reformers for steam production or fuel gas preservation.

The waste gas 1 (1,000,000 $Nm^3/h$) has, for example, a composition 76% $N_2$, 2% $O_2$, 14% $CO_2$, 7.8% $H_2O$, 0.2% $SO_2$, and about 300 ppm $NO_x$, and has a temperature of, for example, 250° C. According to the invention, about 220 $Nm^3/h$ of ammonia is admixed to the waste gas via a conduit 2. The gaseous mixture is subsequently fed to a first section 3a of a pair of regenerators 3, 4. Pursuant to the invention, a layer of catalyst particles 5a is arranged at the hot end of the packing disposed in regenerator section 3a; this layer preferably extends over the entire regenerator cross section. Zeolite-type catalysts are preferably used as the catalyst.

The catalyst favors the reactions:

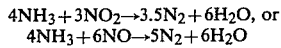

$4NH_3 + 3NO_2 \rightarrow 3.5N_2 + 6H_2O$, or
$4NH_3 + 6NO \rightarrow 5N_2 + 6H_2O$ With a temperature of about 240° C. ambient at the regenerator inlet and with an oxygen content of above 1% in the waste gas (which percentage is practically always present), a 50–60% conversion of the nitrogen oxide can be obtained catalytically. The height of the catalyst packing is, for example, 18 cm; the total height of the regenerator packing necessary for the heat exchange is about 6 m. Approximately 20–30% excess ammonia is added to increase the conversion rate of the nitrogen oxide.

After the reaction has taken place, the waste gas is cooled to about 45° C. by heat exchange with the regenerator packing usually consisting of stone or ceramic material to prevent corrosion. The waste gas is taken in by a compressor 6 and compressed to about 1.3 bar, thus being heated to about 78° C. Subsequently the waste gas is cooled to about 5° C. in a second section 3b of the regenerator 3. At this temperature, condensed water is formed in regenerator section 3b. The ammonia not consumed during the reaction is thereby extensively retained in the regenerator due to its high solubility in water. The waste gas exiting from the regenerator 3 has a composition of about 82.4% $N_2$, 2.2% $O_2$, 15.1% $CO_2$, and 0.3% $SO_2$.

This waste gas is conducted via a conduit 7 to a scrubbing column 8 operated under a pressure of about 1.15 bar. The scrubbing column 8 is charged with a scrubbing medium selective for sulfur dioxide, such as dimethylformamide, for example; this scrubbing agent has a temperature of about 0° C. Almost the entire sulfur dioxide contained in the waste gas is scrubbed out from the latter by the scrubbing medium. The scrubbing medium is supplied via conduit 19.

The purified waste gas presently containing only about 110 ppm of $SO_2$ and having a temperature of about 3° C., is withdrawn from the head of the scrubbing column via conduit 9 and fed to the colder section 4b of the regenerator 4. In this section, the waste gas absorbs the water of condensation as well as the ammonia dissolved in the condensed water and leaves the regenerator section 4b via conduit 10 at about 75° C.

About 1,000,000 $Nm^3/h$ of air 11 is compressed to 1.1 bar to purge the upper regenerator section 4a (compressor 12). At the same time, the air serves to regenerate the catalyst 5b. Most of the air heated to about 240° C. in regenerator section 4a is conducted to the combustion process (conduit 13), thereby resulting in the recycling of waste heat into the process. A portion of the heated air (about 60,000 $Nm^3/h$) is branched off and combined with the purified waste gas 10. Thus thus-produced gas, at a temperature of about 100° C., is fed to a stack via a conduit 14. The heated air is combined with the waste gas in order to raise the temperature of the waste gas and thus increase the rate of upward flow through the stack.

The regenerators 3, 4 are designed to be reversible and are alternatingly charged and regenerated in the same way as the catalyst 5a, 5b. The valves and conduits required for this purpose are not indicated so as not to obscure the drawing.

By way of a conduit 15, scrubbing medium loaded with sulfur dioxide is withdrawn from the sump of the scrubbing column 12, heated in a heat exchanger 16 against regenerated scrubbing medium, and introduced into a regenerating column 17 operated under a pressure of 0.1 bar. Above the inlet, water (conduit 18) and a liquid mixture of scrubbing medium and water (conduit 22), withdrawn from the top section of scrubbing column 8 and cooled off, are fed into the regenerating column 17. Almost pure scrubbing medium is withdrawn (conduit 19) from the sump of the regenerating column 17 and, after cooling in heat exchanger 16 as well as in the heat exchanger 20 which is cooled by a coolant, recycled into the scrubbing column 8. The sump of regenerating column 17 is heated by a boiler 21 operated, for example, with low-pressure steam. Condensed water is withdrawn from the upper portion of regenerating column 17 and heated in a heat exchanger 24 in heat exchange with scrubbing medium and water from scrubbing column 8, and introduced into the scrubbing column 8 (conduit 23) for the removal of scrubbing medium vapor rising with the purified waste gas. For the same purpose, liquid containing primarily scrubbing medium and water is withdrawn from the upper portion of the scrubbing column 12 and reintroduced into the scrubbing column 12 above the withdrawal point (conduit 25).

Gas withdrawn overhead from the regenerating column 17, chiefly containing sulfur dioxide and steam, is cooled by means of a cooler 26, thus condensing part of the steam. The expelled sulfur dioxide is compressed to about 6 bar with a compressor 27, cooled in a heat exchanger 28, and fed to a separator 29 wherein residual water is separated. The sulfur dioxide withdrawn overhead from the separator 29 is conducted via an absorber 30b of a pair of reversible adsorbers 30a, 30b to remove residual steam. To regenerate the absorbers 30a, 30b, about 1,000 Nm$^3$/h of air is branched off from the air steam leaving the regenerator section 4a and fed via a conduit 31 respectively to the loaded one of the two adsorbers 30a, 30b.

Via a conduit 32, pure sulfur dioxide is withdrawn and passed on to subsequent further processing.

Figure 2:
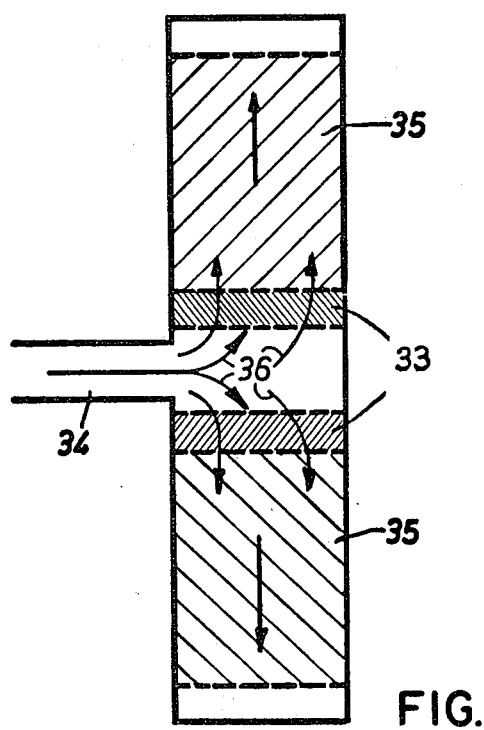
FIG. 2 is a schematic sectional elevation of a double-flow regenerator for conducting the process of this invention.

FIG. 2 shows a schematic vertical sectional view of a double-flow regenerator preferably employed to conduct the process of this invention. In this regenerator, the inlet 34 for the hot waste gas is located in the center of the regenerator. Above and below the inlet 34, respectively one packing of a heat-accumulating mass 35 is arranged, the height of which is, for example, respectively 3,000 mm. A catalyst packing 33 is arranged at the hot ends of each heat-accumulating mass 35, the height of this packing being about 200 mm. Arrows 36 indicate the flow direction of the waste gas. For purging purposes, the regenerator is subjected to a flow of air in the opposite direction of the arrows.

The preceding examples can be repeated with similar success by substituting the generically or specifically described reactants and/or operating conditions of this invention for those used in the preceding examples.

From the foregoing description, one skilled in the art can easily ascertain the essential characteristics of this invention, and without departing from the spirit and scope thereof, can make various changes and modifications of the invention to adapt it to various usages and conditions.

I claim:

1. Apparatus for conducting a process for the removal of undesirable gaseous components from a hot waste gas containing sulfur dioxide and nitrogen oxides, wherein the waste gas is catalytically reduced and then cooled, said apparatus comprising a waste gas conduit, a regenerator housing arranged in the flow path of the waste gas conduit, catalyst packing and heat-accumulating mass being serially arranged in the regenerator housing so that said waste gas first contacts the catalyst packing and then the heat accumulating mass within said regenerator housing; gas supply means for feeding ammonia into the waste gas, said gas supply means being in communication with the waste gas conduit upstream of the catalyst packing; and scrubbing means for removing sulfur dioxide from said waste gas, said scrubbing means arranged downstream of and in communication with said regenerator housing.

2. Apparatus according to claim 1, said catalyst packing being arranged substantially only at the hot end of the regenerator housing.

3. Apparatus according to claim 2, said catalyst packing being of the zeolite type, and said heat-accumulating mass being stone or ceramic.

4. Apparatus according to claim 1, said regenerator housing forming a double flow regenerator having an inlet; and above and below said inlet, first said catalyst packing and then said heat-accumulating mass being disposed therein.

5. Apparatus according to claim 4, said catalyst packing being of the zeolite type, and said heat-accumulating mass being stone or ceramic.

6. Apparatus according to claim 1, said catalyst packing being of the zeolite type, and said heat-accumulating mass being stone or ceramic.

* * * * *